US006059914A

United States Patent [19]
Süss

[11] Patent Number: 6,059,914

[45] Date of Patent: May 9, 2000

[54] PROCESS FOR THE PRODUCTION OF A STAMPING FOIL

[75] Inventor: Joachim Süss, Fürth, Germany

[73] Assignee: Leonhard Kurz GmbH & Co., Furth, Germany

[21] Appl. No.: 09/138,170

[22] Filed: Aug. 21, 1998

Related U.S. Application Data

[63] Continuation of application No. PCT/DE97/00298, Feb. 10, 1997.

[30] Foreign Application Priority Data

Feb. 24, 1996 [DE] Germany ........................... 196 07 015

[51] Int. Cl.[7] ........................... B44C 1/165; B32B 31/00; B32B 3/00; B41M 3/12

[52] U.S. Cl. ........................... 156/230; 156/233; 156/234; 156/235; 156/238; 156/240; 156/241; 156/247; 156/289; 428/195; 428/914

[58] Field of Search ..................................... 156/230, 231, 156/233, 235, 239, 238, 240, 241, 247, 277, 289; 428/195, 209, 211, 412, 914

[56] References Cited

U.S. PATENT DOCUMENTS

| | | | |
|---|---|---|---|
| 2,402,631 | 6/1946 | Hull | 156/292 |
| 4,012,552 | 3/1977 | Watts | 428/200 |
| 4,740,798 | 4/1988 | Shinoazaki | 346/76 PH |
| 4,869,767 | 9/1989 | Robinson et al. | 156/233 |
| 5,338,612 | 8/1994 | Kawaguchi | 428/412 |
| 5,665,475 | 9/1997 | Süssner | 428/488.4 |
| 5,731,064 | 3/1998 | Süss | 428/195 |

FOREIGN PATENT DOCUMENTS

| | | |
|---|---|---|
| 2200332 | 3/1996 | Canada . |
| 0 470 645 A1 | 2/1992 | European Pat. Off. . |
| 37 23 498 A1 | 1/1989 | Germany . |
| 40 33 834 A1 | 5/1991 | Germany . |
| 43 13 519 A1 | 10/1994 | Germany . |
| 44 23 291 A1 | 1/1996 | Germany . |
| WO 96/09174 | 3/1996 | WIPO . |

*Primary Examiner*—Richard Crispino
*Assistant Examiner*—J. A. Lorengo
*Attorney, Agent, or Firm*—Akin, Gump, Strauss, Hauer & Feld, L.L.P.

[57] ABSTRACT

In a process for the production of a stamping foil such as a hot stamping foil having a decorative layer provided on a carrier film only in a region-wise manner, corresponding to a desired patterning of the substrate, negative regions of the decorative layer, which do not remain on the carrier film, are removed from the carrier film of the stamping foil by being pulled off by means of a recipient foil.

4 Claims, 1 Drawing Sheet

PROCESS FOR THE PRODUCTION OF A STAMPING FOIL

This application is a continuation of PTC/DE97/00298 filed Feb. 10, 1997.

FIELD OF THE INVENTION

The invention concerns a process for the production of a stamping foil and more especially a hot stamping foil.

BACKGROUND OF THE INVENTION

There are various stamping foils and in particular also hot stamping foils which make it possible to decorate the surface of a substrate in a given desired fashion, that is to say, which permit given decorative elements to be applied to the surface of the substrate. A typical form of stamping foil comprises a decorative layer which is releasably arranged on a carrier film and which can be transferred on to the substrate by means of heat and/or pressure in order then to adhesively stick to the substrate.

In that respect, particularly when using hot stamping foils, it is a common practice to provide for transfer of the hot stamping foil on to the surface of the substrate by means of a die or stamping punch which is patterned to correspond to the desired decoration on the substrate surface. In that process, when the stamping punch acts on the hot stamping foil, the decorative layer which is arranged on the hot stamping foil over the entire surface area thereof is only transferred on to the substrate surface in the raised regions of the stamping punch. Although that procedure already permits the substrate surface to be of a really attractive configuration, limits are however set both in regard to the coloration thereof and also in regard to the degree of fineness of the decoration.

In order to permit multi-color decoration of the substrate surface, the decorative layer of a stamping foil such as a hot stamping foil may be of a configuration corresponding to the desired decoration, for example the decorative layer may be produced with a multi-color print. That procedure suffers from the disadvantage that a comparatively high level of machine expenditure is required for the decorative layer to be of a multi-color nature. Moreover, if in addition the decoration is not to be provided on the substrate over the entire surface thereof, special expensive means must be used to ensure that the stamping punch or the stamping roller by means of which the decorative layer of the stamping foil is stamped on to the substrate precisely coincides with the decoration of the stamping foil.

A common shortcoming of both the processes as outlined above is that variations in the configuration of the decoration are not possible or they are possible only at the cost of quite serious difficulties. For example there are situations in which the decoration on a substrate which is decorated by means of a stamping foil is to change from one item to another, for example in order to provide the respective correspondingly decorated elements with a serial number. A similarly individual identification can also be afforded by applying a name, a picture or image or the like, in which case the nature of the decoration on a substrate can be desirable in particular as a security element. Reference should here be directed just to the possibility of so designing identity cards or passes, credit cards or in general terms security documents, in such a way as to provide a suitable association with a specific person or an article, for example a vehicle, in a manner which is as forgery-proof as possible.

Admittedly, it is already known for that purpose to provide the decorative layer of a hot stamping foil with an individualising identification, by means of a thermal printing process, before the hot stamping foil is then applied to the substrate. However that procedure also offers only extremely limited options in terms of the design configuration of the decoration.

In the case of stamping foils with a continuous decorative layer covering the entire surface area, there is under some circumstances also the danger that, for example when using a stamping punch which is damaged or which is badly machined, the stamping image produced in the decorative layer on the substrate is not a clean one, either by virtue of the contours being ragged and untidy, or by virtue of the fact that the decorative layer does not adhere cleanly to the substrate in a region-wise manner thereof, for example because of a poor substrate surface. As already mentioned, particular problems arise in connection with the region-wise transfer of decorative layers which are patterned in themselves, as in that case just comparatively minor flaws in regard to orientation of the stamping tool on the one hand and the pattern of the decorative layer on the other hand are clearly visibly reflected on the substrate.

SUMMARY OF THE INVENTION

An object of the present invention is to provide a process for the production of a stamping foil such as a hot stamping foil which avoids the above-mentioned disadvantages insofar as the result of the process is a foil which, without precise registration of a stamping punch and decoration of the decorative layer of the foil, results in a clean and accurate decoration on the substrate surface.

Another object of the invention is to provide a process for the production in a simple manner of a stamping foil which can be offered with a comparatively finely patterned decorative layer thereon.

A further object of the invention is to provide a process for the production of a stamping foil which if necessary readily affords the possibility of quickly altering the respective decoration, for example in order individually to identify individual documents.

Yet another object of the invention is to provide a process which permits the production of such stamping foils in an especially simple manner.

In accordance with the invention the foregoing and other objects are attained by a process for the production of a stamping foil such as a hot stamping foil which comprises a decorative layer releasably arranged on a carrier film and adapted to be transferred on to a substrate by means of heat and/or pressure and to adhesively stick to the substrate. The decorative layer is provided on the carrier film only in a region-wise manner corresponding to a desired patterning of the substrate. To produce that stamping foil, in the region in which no decorative layer is wanted on the carrier film, a recipient or capturing foil which has good adhesion to the decorative layer is brought into contact, under the action of heat and/or pressure, with the decorative layer which is present over a large area on the carrier film so that the decorative layer adheres to the recipient foil in the corresponding regions. The recipient foil is then pulled off with region-wise entrainment of the decorative layer from the carrier film of the stamping foil and the decorative layer remains on the carrier film only in accordance with the desired patterning of the substrate.

In contrast to the prior stamping foils in which hitherto basically the decorative layer or at least one of the layer portions of the decorative layer was provided over the entire surface area, the invention proposes a process whereby for the first time the stamping foil is produced in such a form as to have a suitable decorative layer only in the regions in which the substrate is actually to be provided with a corresponding decoration or patterning. With the stamping foil being of such a nature, very simple tools can be used for transferring the decorative layer on to the substrate, those tools basically acting over a large surface area, for example being suitable pressure rollers. Nonetheless a clean and neat region-wise decoration of the substrate surface is obtained, corresponding to the configuration of the decorative layer of the stamping foil. There is also scarcely any danger of the decoration on the substrate surface having any untidy or smudgy portions because in fact the configuration of the decoration is already accurately predetermined and the region of the decorative layer does not have to be broken or torn out of the decorative layer, which is provided over the entire surface area involved, in the course of the stamping procedure, as was the usual practice hitherto with region-wise decoration using hot stamping foils. Even if the adhesion between the decorative layer and the substrate is only slight in a region-wise manner, which occasionally cannot be avoided, that does not result in the quality of the decoration on the substrate being adversely affected, because in fact the whole of the decorative layer on the carrier film is transferred on to the substrate when using a stamping foil according to the invention.

The stamping foil produced by the process according to the invention can be of various different configurations. It may be particularly desirable if a hot stamping foil produced in accordance with the invention provides that the decorative layer, starting from the carrier film, includes a protective lacquer layer portion, at least one pigmented or color lacquer layer portion and/or metal layer portion and an adhesive layer portion. In that respect the decorative layer of a hot stamping foil produced by the process according to the invention basically corresponds to hot stamping foils as are described for example in DE 43 13 519 A1 to which reference may therefore be directed.

It may further be desirable if a release layer is arranged between the carrier film and the decorative layer, and/or if the adhesive layer portion can be activated by radiation, in particular heat.

It will be appreciated that, while it would be possible for the decorative layer which is provided only in a region-wise manner on the carrier film of the substrate, in particular in the case of a hot stamping foil, to be produced by a procedure whereby the various layer portions of the decorative layer are suitably applied only in a region-wise manner to the carrier film, for example by suitable printing processes, on the one hand however that would suffer from the disadvantage that the above-discussed problems of printing a plurality of layer portions in accurate register relationship would have to be overcome. Moreover, a particular disadvantage with a procedure of that kind is that the production of new patterns on the decorative layer would be possible only at quite considerable cost, so that a change in the pattern would be considered in each case only after a very large number of items have been produced.

In the procedure in accordance with the invention therefore the recipient foil, in the form of a negative image of the desired decoration, is pressed against the decorative layer in the regions in which no decorative layer is to be present on the stamping foil, and then the decorative layer is suitably removed from the carrier film of the stamping foil in a region-wise manner, by pulling the recipient foil off. The operation of pressing the recipient foil against the decorative layer of the stamping foil can be effected by tools which can also be altered very quickly for the purposes of changing the patterning of the decorative layer. At any event it is no longer necessary to produce the comparatively expensive stamping punches. It would possibly even be conceivable for example for the operation of pressing the recipient foil against the decorative layer to be conducted in the manner of a ‘writing operation’, for example with devices which are known for the production of written script, under some circumstances even by using hand pressure, for example to simulate handwriting. In that way the decorative layer can also be provided in a very simple fashion with individual patterning which changes for example from one document to another. For that purpose, it would be sufficient to successively ‘write’ on to the recipient foil identifications, for example serial numbers, which alter in accordance with the arrangement on the respective substrate, whereby the recipient foil is pressed against the substrate in accordance with those variable identifications. If a normal writing apparatus similarly to a typewriter is used for that purpose, that would then produce a corresponding identification in negative script on the stamping foil.

When the process according to the invention is carried into effect in a practical context, it is desirable to use a recipient foil which comprises a carrier film and an adhesive layer portion in which the adhesive layer portion has substantially better adhesion both with respect to the carrier film of the recipient foil and also with respect to the decorative layer of the stamping foil, than the adhesion of the decorative layer of the stamping foil in relation to the carrier film thereof.

As already mentioned there are a large number of different possible ways of suitably pressing the recipient foil against the decorative layer of the stamping foil. It is particularly desirable here if the recipient foil is brought into contact in a point-wise manner with the regions, which are to be pulled off, of the decorative layer of the stamping foil; it will be appreciated that in that case the elements producing the point-wise contact should then be of such a configuration that they can be displaced in the smallest possible pattern steps in relation to the recipient foil or stamping foil. Then, according to the size of the pressing points, it is possible to produce all possible images or patterns for the decorative layer, with the corresponding degree of resolution being dependent only on the degree of fineness of the respective points.

Particularly good adhesion of the recipient foil to the decorative layer and at the same time clean release thereof from the carrier film is achieved by the recipient foil being brought into contact, under the effect of heat and/or pressure, with the regions of the decorative layer of the stamping foil, which are to be pulled off, while desirably operation is such that the recipient foil is brought into contact by means of a thermal transfer print head with the regions of the decorative layer of the stamping foil, which are to be pulled off. Thermal transfer heads of that kind including the hardware and software required for actuation thereof are known elements. They can be installed without difficulties in stamping and laminating apparatuses which are also known per se and by means of which the stamping and the recipient foil can be suitably moved to each other and then moved away from each other again, to detach the regions of the decorative layer, which are not wanted. Many different options in regard to the configuration of the decorative layer of the stamping foil are afforded when using thermal transfer print heads of that kind.

Further objects, features and advantages of the invention will be apparent from the following description of an embodiment of the invention.

DESCRIPTION OF THE PREFERRED EMBODIMENT

Figure 1:
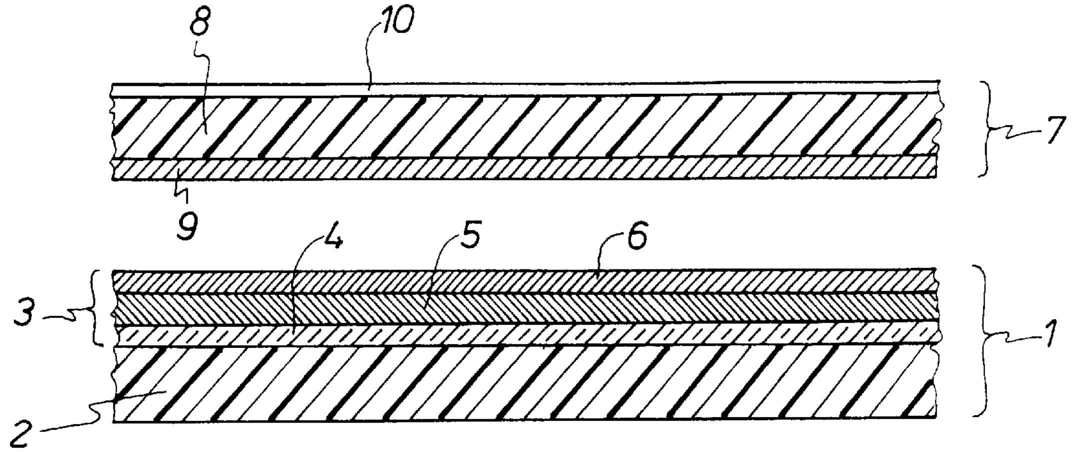
FIG. 1 shows a recipient foil and a stamping foil in the arrangement required for carrying out the process according to the invention, FIG. 2 diagrammatically shows the step of pressing the recipient foil against the decorative layer of the stamping foil.
Figure 2:
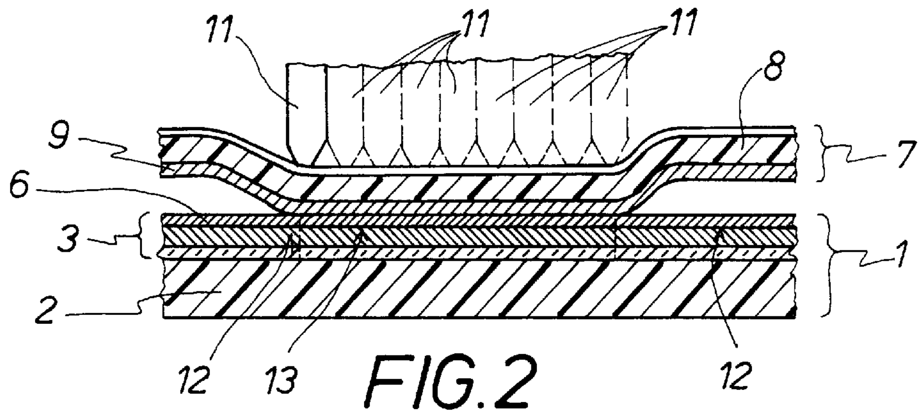

Referring firstly to FIGS. 1 and 2 shown in diagrammatic form therein is a stamping foil indicated generally at 1 and a recipient or capturing foil indicated generally at 7.

The stamping foil 1 shown in FIGS. 1 and 2 is a per se known hot stamping foil as is described basically for example in DE 43 13 519 A1 to which reference is accordingly directed for appropriate incorporation herein. In that respect however the additional decorative lacquer layer portion shown in that document can be omitted, having regard to the specific way of producing the decoration in accordance with the invention. For certain areas of use however it would also be possible to provide the decorative layer with a particular patterning effect which is produced by a printing process.

The stamping foil 1 shown in FIG. 1 comprises in per se known manner a carrier film 2, for example of PET of a thickness of between about 19 and 23 μm.

A decorative layer generally identified by reference numeral 3 adheres to the carrier film 2, generally by way of a wax-like release layer which is not shown in the drawing. In the illustrated embodiment, starting from the carrier film 2, the decorative layer 3 includes a transparent protective lacquer layer portion 4, a pigmented or colored lacquer layer portion 5 and an adhesive layer portion 6, the compositions of the protective lacquer layer portion 4, the colored lacquer layer portion 5 and the adhesive layer portion 6 being so selected that those three layer portions have very good adhesion to each other.

Instead of the colored lacquer layer portion 5 it would also be possible to provide another decorative layer portion, for example a lacquer layer portion which is only colored but which is nonetheless transparent, a metal layer portion or the like. It would also be possible for the colored lacquer layer portion 5 to be replaced in a manner known from hot stamping foils by a plurality of layer portions, and for example also to provide a hologram layer or a layer which has an optical-diffraction effect in some other fashion. In principle there are no serious limitations in terms of the design configuration of the decorative layer 3. This involves a layer which is known and usual per se in relation to hot stamping foils and which if necessary can be subdivided into fine pattern or grid points and which can be detached in that form from the carrier film 2.

The thickness of the lacquer layer portions 4 and 5 and the adhesive layer portion 6 are also selected in the range which is usual in relation to hot stamping foils, in dependence on the respective requirements involved. The thickness of the lacquer layer portions 4, 5 is normally between 1 and 10 μm. The adhesive layer portion is usually from 0.5 to 5 μm in thickness, while it is perhaps even possible to omit a special adhesive layer portion 6 if the layer portion 5 has suitably adhesive properties.

The recipient or capturing foil 7 which is above the stamping foil looking at FIG. 1 corresponds in terms of its structure to a per se known thermal transfer foil, insofar as that is desirable for contacting with the decorative layer 3 by means of a thermal transfer printer. The recipient foil 7 however includes only a carrier film 8 and an adhesive layer portion 9; a particularity in this respect is that the adhesive layer portion 9 enjoys very good adhesion to the carrier film 8. There may also be provided a sliding or anti-friction layer 10 which serves to ensure satisfactory sliding movement of the recipient foil 7 with respect to the print head, for example a thermal transfer print head.

Particularly if the situation involves producing very fine patterning of the decorative layer of the stamping foil 1, the recipient foil 7 should be relatively highly flexible in order to permit the recipient foil 7 to be pressed in very small regions thereof against the decorative layer 3 of the stamping foil 1. In order to achieve that, the carrier film 8 is normally substantially thinner than the carrier film 2 of the stamping foil 1. For example the carrier film 8 of the recipient foil 7 may be a PET film of a thickness of between 3.5 and 12.0 μm. The sliding or anti-friction layer portion is between 0.1 and 1 μm in thickness. The adhesive layer portion of the recipient foil 7 is between about 0.5 and 5 μm in thickness.

Examples of the composition of the various layer portions are as follows:

| | Parts |
|---|---|
| Protective lacquer layer 4 | |
| Methylethylketone | 40 |
| Toluene | 30 |
| Polymethlmethacrylate (MW: about 100,000, density: 1.18 g/ccm) | 20 |
| Polyvinylidenefluoride (density about 1.7 g/ccm) | 8 |
| UV-absorber (benzotriazole derivative, density 1.17 g/ccm) | 1.5 |
| HALS-stabiliser (tetramethylpiperidine derivative) | 0.5 |
| Colored lacquer layer portion 5 | |
| Methylethylketone | 40 |
| Toluene | 20 |
| Polyinethylacrylate (MW: 60,000, density: 1.13 g/ccm) | 15.5 |
| Acrylate polymer (40% in toluene Tg = 50° C.) | 10.5 |
| Polyvinylidene fluoride (density about 1.7 g/ccm) | 3 |
| High-molecular dispersing additive | 4 |
| Pigment Red 149 | 6 |
| Pigment Red 122 | 1 |
| Adhesive layer portion 6 (of the stamping foil) | |
| Methylethylketone | 65 |
| Toluene | 17 |
| Linear thermoplastic polyurethane (density: 1.15 g/ccm) | 8 |
| Unsaturated polyester resin (density: 1.23 g/ccm, acid number: 15) | 8 |
| Amorphous silicic acid (particle size about 10μ) | 2 |
| Adhesive layer portion 9 (of the recipient foil) | |
| Methylethylketone | 65 |
| Toluene | 14 |
| Cyclohexanone | 5 |
| Vinyl chloride/vinyl acetate copolymer (softening point: 115° C.) | 7 |
| Copolyester resin (softening point: 67° C.) | 7 |

-continued

| | Parts |
|---|---|
| Amorphous silicic acid | 2 |
| Anti-friction layer portion 10 | |
| Methylethylketone | 81 |
| Cyclohexanone | 12.5 |
| Cellulose acetopropionate | |
| (Fp: 210° C., d = 1.24 g/ccm) | 5 |
| Polyvinylidene fluoride (d = 1.7 g/ccm) | 1.5 |

Figure 3:
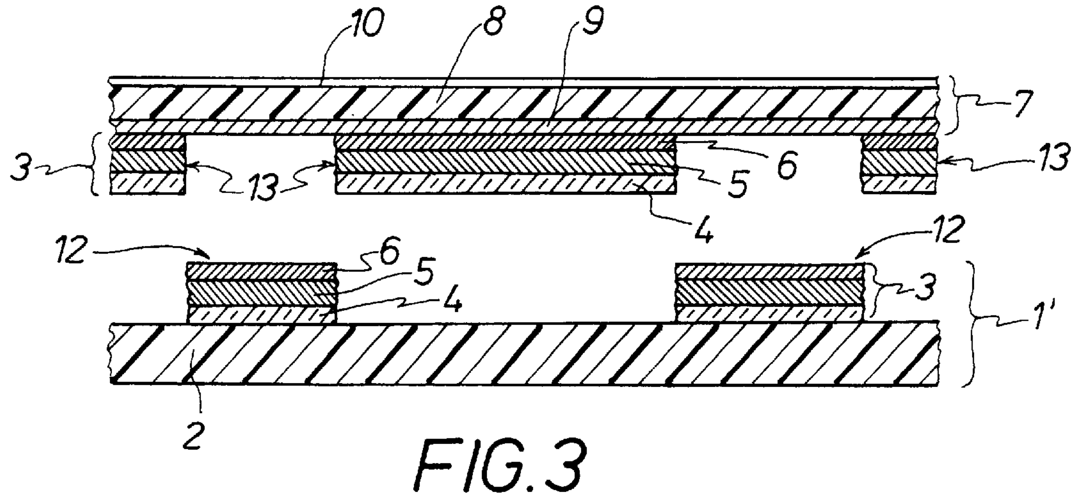
FIG. 3 shows a stamping foil according to the invention and the recipient foil with the negative regions of the decorative layer, the recipient foil having been pulled off after the process according to the invention has been carried into effect.

Reference will now be more specifically made to FIGS. 2 and 3 to illustrate the process for the production of a stamping foil in the form of a hot stamping foil according to the invention.

In that respect, FIG. 2 shows how the adhesive layer portion 9 of the recipient foil 7 is pressed in a region-wise manner against the adhesive layer portion 6 of the decorative layer 3 of the stamping foil 1 by means of a suitable pressure element, for example a heated pressure element 11 of a thermal transfer print head. In that pressing operation, at any event a sufficient pressure is applied to the recipient foil 7 to ensure sound adhesion of the corresponding region of the adhesive layer portion 9 of the recipient foil 7 to the adhesive layer portion 6 of the decorative layer 3 of the stamping foil 1.

The illustrations shown in broken line and indicated at 11' in respect of the pressure element 11 in FIG. 2 are intended to indicate that this pressing procedure can be repeated to correspond to the desired negative image of the pattern of the decorative layer 3 of the stamping foil 1, while there is the possibility of producing relatively fine patterns, according to the structural size of the pressure element 11.

The compositions of the adhesive layer portion 9 of the recipient foil 7 and the layer portions 4, 5 and 6 of the decorative layer 3 of the stamping foil 1 are so selected that on the one hand the two adhesive layer portions 6, 9 have very good adhesion to each other after they have been pressed against each other, possibly with heat acting thereon. On the other hand however it is also ensured that the layer portions 4, 5 and 6 of the decorative layer 3 adhere to each other so firmly that, when the recipient foil 7 is pulled off, the entire decorative layer 3 is reliably pulled off the carrier film 2 of the stamping foil 1 in the region or regions in which the two adhesive layer portions 6, 9 came into contact with each other.

FIG. 3 shows the condition after the recipient foil 7 has been pulled off the stamping foil 1. FIG. 3 clearly shows at the bottom that the stamping foil 1' which is produced with the process according to the invention only retains the decorative layer 3 in the regions 12, while in the other regions 13 corresponding to the negative representation or image of the desired decoration, the decorative layer 3 has been pulled off the carrier film 2 of the stamping foil 1 and by way of its adhesive layer portion 6 adheres to the adhesive layer portion 9 and thus to the carrier film 8 of the recipient foil 7.

As there is a very great degree of freedom in regard to the configuration of the negative decoration (regions 13), in dependence on the choice of the element 11, 11' used for performing the pressing operation, it will be appreciated that it is also possible to provide for a large number of variations in regard to the decorative layer regions 12 which remain on the carrier film 2 of the stamping foil 1' in that case, without a fundamental change in the process being necessary for that purpose. In particular, when adopting a suitable pressing apparatus 11, 11', it is very rapidly possible to produce a change in the pattern of the decorative layer, for example a change in the pattern from one substrate element to another, in order individually to identify or characterise the individual substrate elements.

It will be apparent that stamping foils produced by the process according to the invention can be used for the most widely varying range of purposes. Depending on the nature of the decorative layer 3, it is possible to decorate the most widely varying substrates, for example plastic surfaces, paper, cardboard, textiles, wood, metal and glass. This suitability for universal use on the most widely varying substrates means that the foils produced according to the invention can also be employed for a large number of areas of use, for example for the sign and signplate industry, for passes and identity cards, for the card industry, for decorative packagings and so forth, while it is certainly also possible to include security-relevant areas of use, ore specifically in particular by virtue of the possibility of altering the patterning of the decorative layer of the finished stamping foil from one substrate element to another.

The stamping foil produced by the process according to the invention is used in the usual fashion, that is to say for example when the stamping foil is a hot stamping foil, it is transferred on to a substrate using a per se known procedure, under the effect of pressure and/or heat. The advantage when using a stamping foil produced in accordance with the invention is now in particular that special expensive tools which are of a configuration corresponding to the desired patterning are no longer required for applying the decorative layer to the substrate. In general transfer of the decorative layer on to the substrate can be effected by means of tools which act over a large surface area, for example by means of rollers or the like.

The process of the invention has been described hereinbefore in connection with a hot stamping foil, in which case the corresponding decorative layer can be a pigmented lacquer layer portion, but it could also be a metallised or partially metallised layer portion which could possibly be provided with elements with an optical-diffraction effect. It would even be possible to provide a decorative layer 3 which is already patterned in a per se known printing or stamping procedure so that virtually a further, possibly variable patterning effect could then be superimposed in accordance with the invention on that original patterning.

It will be appreciated that the above-described embodiment of the invention has been set forth solely by way of example and illustration of the principles of the invention and that various modifications and alterations may be made without thereby departing from the spirit and scope of the invention.

What is claimed is:

1. A process for the production of a stamping foil comprising a carrier film and a decorative layer which is releasably arranged on the carrier film in a region-wise manner corresponding to a desired patterning for a substrate and which is adapted to be transferred onto a substrate, the process comprising contacting a recipient foil under action of at least one of heat and pressure applied directly to the recipient foil, with regions of the decorative layer in which no decorative layer is wanted on the carrier film of the stamping foil such that the decorative layer adheres to the recipient foil in said regions in which no decorative layer is wanted, wherein the decorative layer is present over a large area on the carrier film of the stamping foil, and the recipient foil comprises a carrier film and an adhesive layer portion, said adhesive layer portion having substantially better adhesion with respect to the carrier film of the recipient foil and with respect to the decorative layer of the stamping foil, than adhesion of the decorative layer of the stamping foil to the carrier film of the stamping foil, and pulling off the recipient foil with region-wise entrainment of the decorative layer from the carrier film of the stamping foil such that the decorative layer remains on the carrier film of the stamping foil in regions corresponding to the desired patterning.

2. The process of claim 1, wherein the recipient foil is contacted with the regions of the decorative layer of the stamping foil to be pulled off in a point-wise manner.

3. The process of claim 2, wherein the recipient foil is contacted with the regions of the decorative layer of the stamping foil to be pulled off using a thermal transfer print head.

4. A process for production of a hot stamping foil for application to a substrate, the foil comprising a carrier film and a decorative layer releasably arranged on the carrier film in a region-wise manner corresponding to a desired patterning for a substrate and which is adapted to be adhesively transferred onto a substrate, the process comprising providing a hot stamping foil including a carrier film and a decorative layer which is releasably carried on the carrier film over an area of the carrier film;

providing a recipient foil which has an adhesive property in relation to the decorative layer of the stamping foil;

bringing the recipient foil into adhesive contact with the decorative layer in regions in which no decorative layer is wanted on the carrier film, whereby the decorative layer adheres to the recipient foil in said regions in which no decorative layer is wanted; and separating the recipient foil and the stamping foil, whereby said recipient foil pulls said regions of the decorative layer in which no decorative layer is wanted off the carrier film of the stamping foil and portions of the decorative layer remain on the carrier film in regions corresponding to said desired patterning.

* * * * *